UNITED STATES PATENT OFFICE.

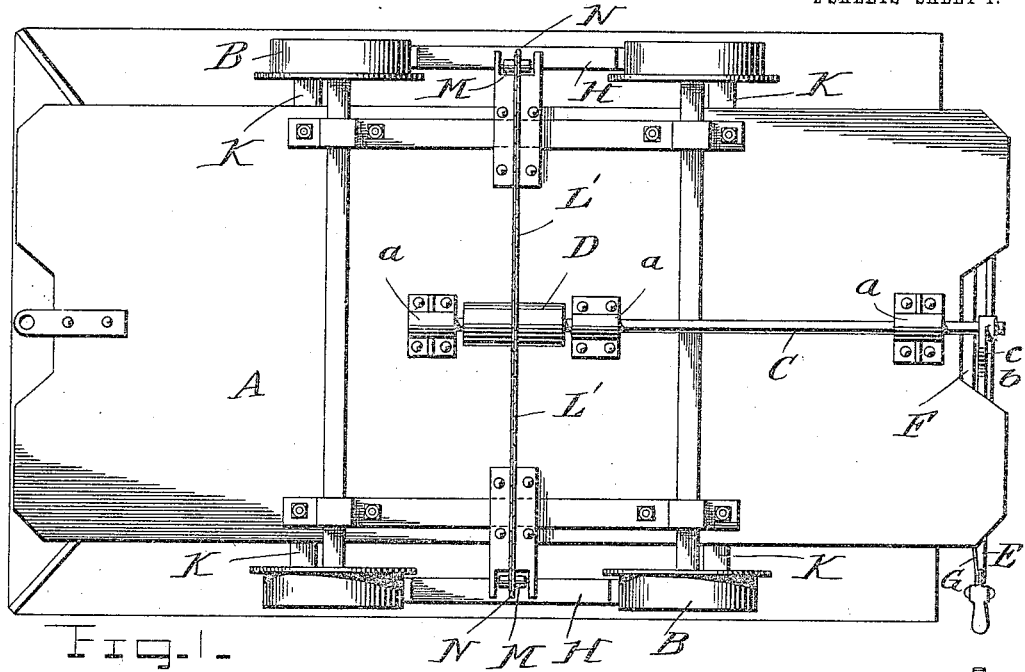

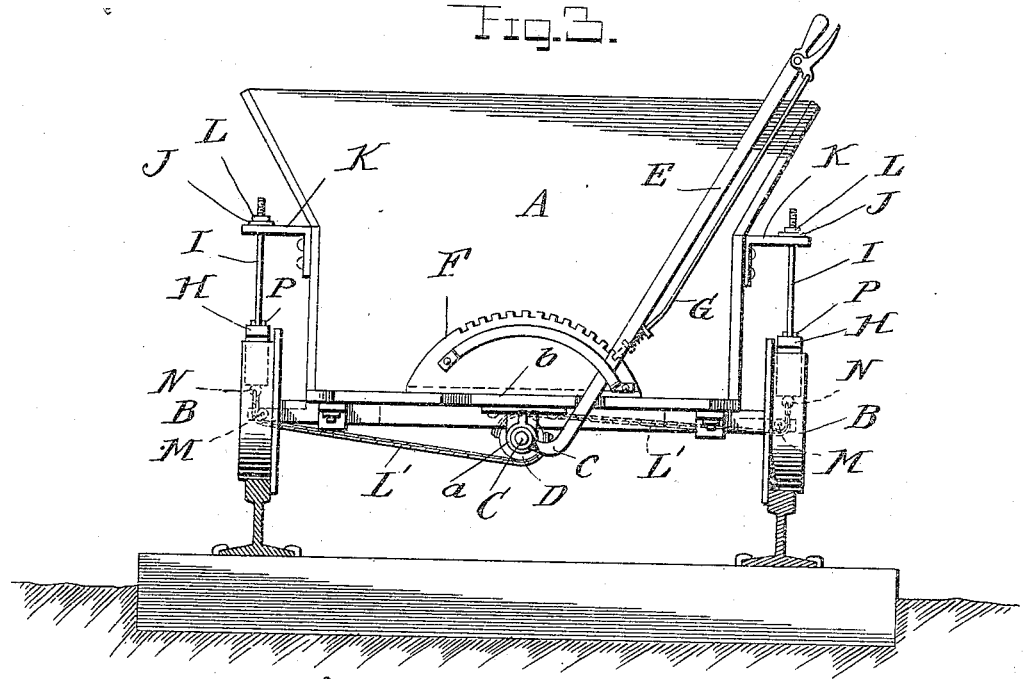
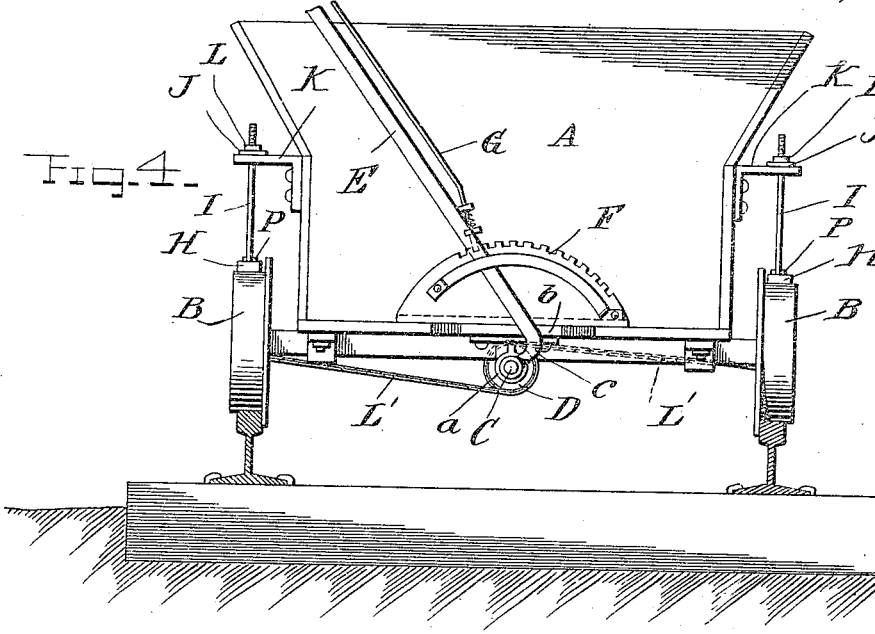

THOMAS H. MORGAN, OF McCARTNEY, PENNSYLVANIA.

CAR-BRAKE.

952,924.  Specification of Letters Patent.  Patented Mar. 22, 1910.

Application filed October 19, 1909. Serial No. 523,453.

*To all whom it may concern:*

Be it known that I, THOMAS H. MORGAN, citizen of the United States, residing at McCartney, in the county of Clearfield and State of Pennsylvania, have invented certain new and useful Improvements in Car-Brakes, of which the following is a specification.

My present invention has to do with car brakes and more particularly to car brakes of the hand-operated type.

The object of the invention is to provide a powerful and reliable brake of simple and inexpensive construction, and one that is susceptible of ready installation and is well adapted to withstand the strain and usage to which car brakes are ordinarily subjected.

The invention will be best understood by reference to the following description considered conjunctively with the accompanying illustration of one specific embodiment thereof, while its scope will be more particularly pointed out in the claims appended.

In the drawings constituting said illustration and forming part hereof: Figure 1 is an inverted plan view of a car equipped with my novel brake. Fig. 2 is a side elevation of the said car. Fig. 3 is an end elevation of the car showing the lever in the position it occupies when the brake is released or idle. Fig. 4 is a similar view showing the position of said lever when the brakes are applied or set.

Similar letters designate corresponding parts in all of the views of the drawings, referring to which:

A is a car body, and B B are car wheels, all of which may be of the conventional construction and form or of any other construction and form consonant with the purpose of my invention.

C is a longitudinal rock shaft forming a working part of my novel brake. The said rock-shaft C is journaled in suitable bearings *a* on the underside of the body A, and is provided near one of its ends with a drum D. On its opposite end the rock-shaft is provided with a lever E which is preferably, though not necessarily, of the hand type. This lever is movable transversely in a play-space *b* provided in one end of the body, and its portion adjacent the rock-shaft C is preferably curved, as indicated by *c*. As best-shown in Figs. 3 and 4, the lever E is movable adjacent a fixed segmental rack F, and is equipped with a detent G for coöperating with the rack and adjustably fixing the lever in the various positions in which it is placed.

H H are vertically movable shoes each of which is disposed at one side of the body A and between two of the wheels B and above the space intermediate said wheels. Each shoe H is fixed to two guide-rods I, and these latter extend upward and loosely through a spring bar J, mounted on brackets K fixed to the side of the body A. Above the spring bars J, of which there is one at each side of body A, the rods I are provided with enlargements L, preferably adjustable nuts, and consequently it will be manifest that when the shoes are drawn downward, the bars J will be put under tension, and that when the shoes are subsequently released, the spring bars in returning to their normal state will raise the shoes and strongly and securely hold the same out of contact with the perimeters of the wheels.

L' L' are cables, preferably in the form of chains, passed in opposite directions around the drum D and suitably connected thereto. From the drum D the said cables pass in opposite directions to the sides of the body A where they are carried around anti-friction rollers M and upward for connection to the lower ends of bolts N. These latter extend loosely upward through the shoes H and are provided above the shoes with nuts P, by turning of which the cables may be adjusted and the released position of the shoes H may be adjustably fixed at various distances from the wheels as occasion demands.

In the practical operation of the brake, the shoes H are maintained by the spring bars J in the raised position shown in Fig. 2 when the brake is released, and the lever E is in the position shown in Fig. 3. From this it follows that when the lever E is thrown to the position shown in Fig. 4, the cable connections will be taken up on the drum D, and the shoes H will be drawn downward, against the action of the spring bars J, and applied to the wheels B. It also follows that when the lever E is adjustably fixed in the position shown in Fig. 4, the brake will be locked in its applied position. To release the brake it is simply necessary to unlock the lever E and shift the same to the position shown in Fig. 3, when the spring bars J will raise the shoes H out of contact with the wheels B and by so doing will take up slack of the cable connections and place the brake in condition for immediate response when the lever E is again moved to the position shown in Fig. 4.

It will be noted from the foregoing that as a whole the novel brake is simple and inexpensive in construction and embodies no parts likely to get out of order after a short period of use, and that the spring bars J and the connection of the shoes H with the same assure the shoes resting at all times in proper position for quick and proper application of the brake.

While I have shown and described one form of my invention, it is to be understood that I am not limited to the details or the form or relative arrangement of parts disclosed, but that limited modifications may be made therein without departing from the spirit thereof.

Having described my invention, what I claim and desire to secure by Letters Patent, is:

1. In a car brake, the combination of a car body having a play space at one end, wheels supporting the body and arranged in pairs at opposite sides thereof, anti-friction rollers mounted at opposite sides of the body, longitudinally-disposed spring bars supported at their ends on the sides of the body, vertically-movable shoes disposed between and above the wheels and having rods arranged one in front of the other and connected with the spring bars, bolts extending vertically and loosely through the shoes and provided above the same with nuts, a longitudinal rock-shaft journaled in bearings below the body and having a drum, cable connections wound in opposite directions on the drum and extending around the anti-friction rollers and between the drum and the said bolts, a lever fixed on the rock-shaft and having a curved portion arranged adjacent the same and movable in the said play space of the body, a segmental rack fixed to the body, and a detent carried by the lever and adapted to coöperate with the said rack.

2. The combination in a car brake, of a car body, wheels supporting the body and arranged one in front of the other at opposite sides of the body, longitudinally-disposed spring bars supported at their ends on the sides of the body, vertically movable shoes disposed between and above the wheels, rods arranged one in front of the other and connecting each shoe with the spring bar above the same, bolts extending vertically and loosely through the shoes and having nuts disposed above the shoes, cables connected to the lower ends of said bolts, and means for taking up and letting out said cables.

In testimony whereof I affix my signature in presence of two witnesses.

THOMAS H. MORGAN.

Witnesses:
  D. P. LOUGHHEAD,
  ESSIE FILLION.